(No Model.) 2 Sheets—Sheet 2.

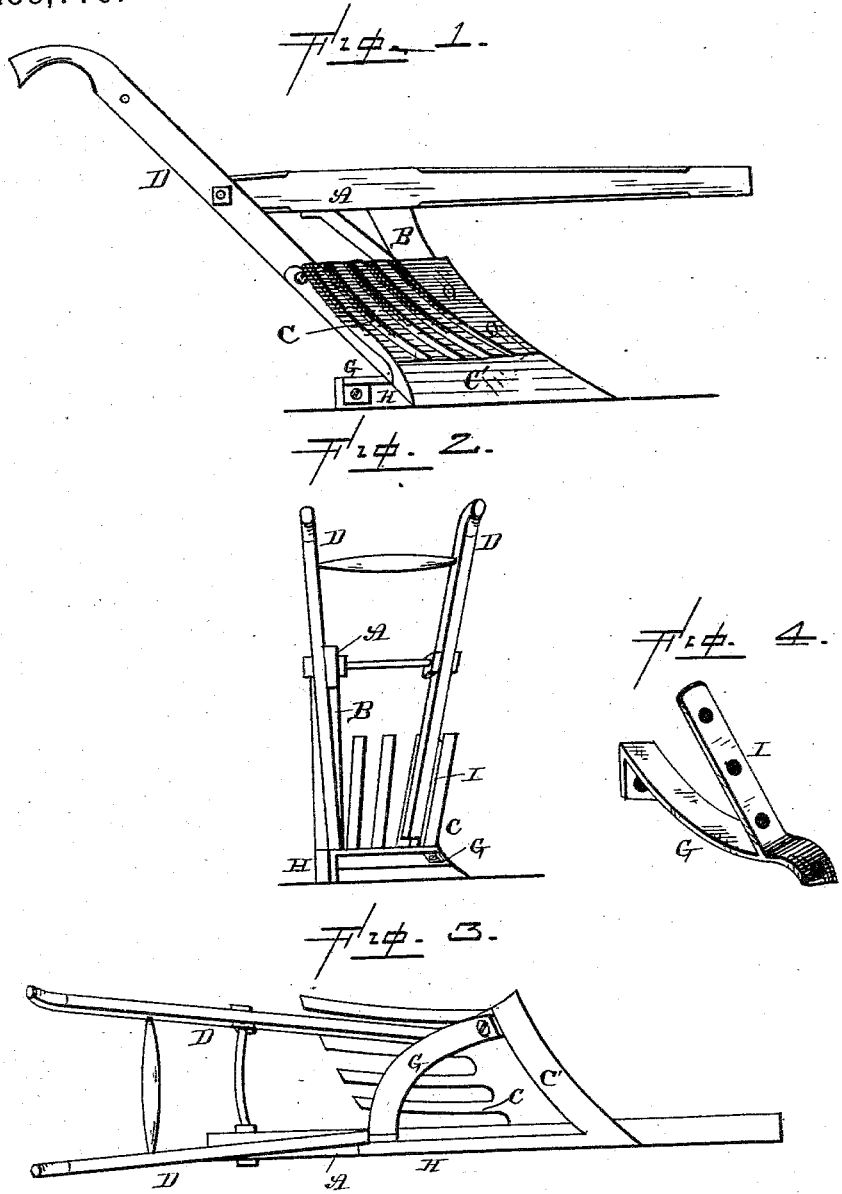

F. CHEVALIER.
PLOW.

No. 288,776. Patented Nov. 20, 1883.

Witnesses.
Louis F. Gardner
A. S. Pattison

Inventor.
F. Chevalier,
per
F. A. Lehmann,
atty

UNITED STATES PATENT OFFICE.

FRANK CHEVALIER, OF LEXINGTON, KENTUCKY.

PLOW.

SPECIFICATION forming part of Letters Patent No. 288,776, dated November 20, 1883.

Application filed June 7, 1883. (No model.)

*To all whom it may concern:*

Be it known that I, FRANK CHEVALIER, of Lexington, in the county of Fayette and State of Kentucky, have invented certain new and useful Improvements in Plows; and I do hereby declare the following to be a full, clear, and exact description of the invention, such as will enable others skilled in the art to which it pertains to make and use it, reference being had to the accompanying drawings, which form part of this specification.

My invention relates to an improvement in plows; and it consists in the combination of the standard, the mold-board which is attached thereto, and the brace which supports the rear corner of the mold-board, and has one of the handles attached thereto, as will be more fully described hereinafter.

Figure 5:
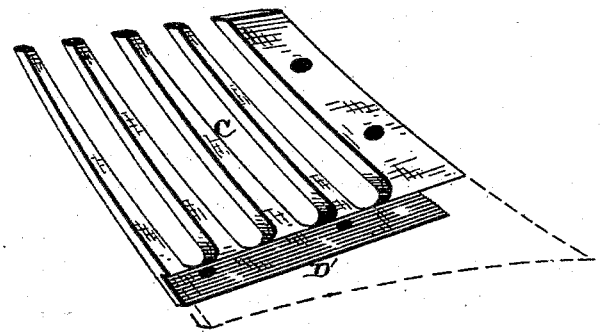
Figure 6:
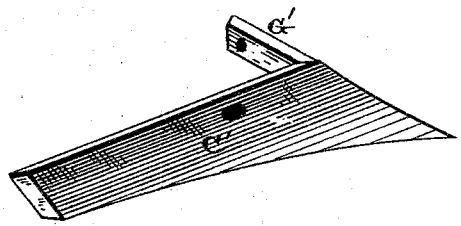

Figure 1 is a side elevation of my invention. Fig. 2 is a rear view. Fig. 3 is an inverted view. Fig. 4 is a detailed perspective of the brace. Figs. 5 and 6 are perspectives of the mold-board and share detached.

A represents the beam, B the standard, C the mold-board, and D the handles.

The mold-board is fastened to the front beveled edge of the standard by means of a suitable number of bolts or other fastenings, has the share C' secured to its lower edge, and has its rear lower corner secured to the brace G. This mold-board has the whole of its upper portion formed into fingers or prongs, which serve to break up the earth, and has formed upon its lower edge the flange D', to which the share C' is fastened. By making the mold-board C and the share C' in two different parts the share can be removed, whenever it is worn out, and replaced by another. The inner end, G', and the share C' are turned backward, so as to form a portion of the landside, as shown in Fig. 6.

The brace G has one end attached to the landside H and the other end secured to the inner side of the mold-board, as shown. The mold-board has no other support at its outer end than this brace, which brace has an arm or prong, I, projecting upward from it, and to which the lower end of one of the handles is secured. The lower end of the other handle is secured to the inner side of the landside, in the usual manner. This brace, it will be seen, supports the mold-board at its outer edge and forms a means of attachment for one of the handles. This construction is absolutely necessary, because the mold-board is divided into prongs or fingers, as shown, so as to adapt it especially for digging potatoes and for use in sticky soil. In digging potatoes the earth falls back through the spaces between the prongs or fingers, and if the handles were attached directly to the rear side of the mold-board it would only serve to prevent the free passage of the dirt. By means of the construction here shown the earth can pass freely through between the prongs or fingers, passing the lower end of the handle and the arm which extends upward from the brace.

By means of the construction above described a very cheap, simple, and light plow is produced, and which is adapted especially for digging potatoes, or in those soils where it is too sticky or waxy for plows of the ordinary construction.

Having thus described my invention, I claim—

In a plow, the combination of the mold-board C, having its upper portion divided into fingers or prongs, and provided with the flange D', with the share C', which is attached thereto, and the brace G, having the upturned arm I, one end of the brace being secured to the landside, the other to the mold-board, substantially as shown and described.

In testimony whereof I affix my signature in presence of two witnesses.

FRANK CHEVALIER.

Witnesses:
JOHN McMURTRY,
L. ROYALTY.